3,191,308
MEASURING AND LINING TOOL
Walter K. Lindenau, Daly City, Calif.
(1201 Edinburgh St., San Mateo, Calif.)
Substituted for abandoned application Ser. No. 38,034, June 22, 1960. This application Aug. 8, 1962, Ser. No. 216,025
2 Claims. (Cl. 33—87)

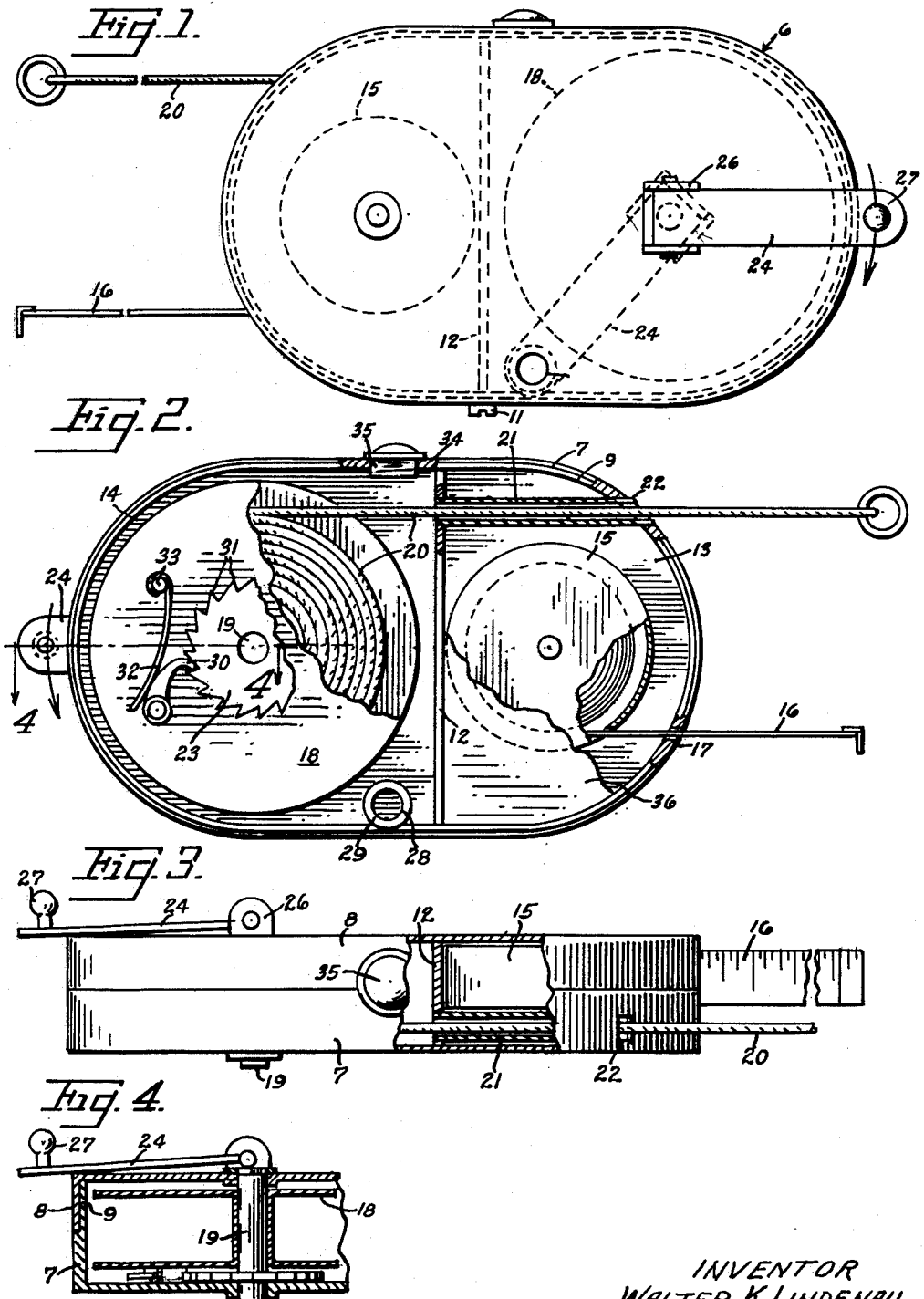

This invention relates to measuring and lining tools, and more particularly to a tool in which a measuring tape and a marking cord are mounted in a single casing from which they may be withdrawn in parallel relation.

It is among the objects of the invention to provide a tool in which measuring and lining devices may be compactly housed within a single casing from which they may be extended and retracted for use independently or simultaneously, as desired.

Another object is to provide a combined measuring and lining tool in which the lining means is housed in a compartment in which a marking substance may be contained entirely isolated from a measuring device housed in a separate compartment.

It is also an object of the invention to provide a tool of the character described which embodies improved features of construction and arrangement affording simplicity and economy in constructing and assembling the device, and which will facilitate its use for multiple purposes.

The invention has other objects and features of advantage, some of which, with the foregoing, will be hereinafter explained in connection with the illustrative embodiment of the invention shown in the accompanying drawings forming a part of the present specification. It is to be understood that the invention is not limited to the structural features shown in the drawings, as the invention may be embodied in other forms, and the structural details may be variously modified, within the scope of the appended claims.

In the drawings:

FIG. 1 is a top or front view of the tool of the present invention;

FIG. 2 is a view of the device as viewed from the back of FIG. 1, and with the housing cover removed;

FIG. 3 is a side elevational view of the device as shown in FIG. 1; and

FIG. 4 is a fragmental transverse sectional view, the plane of the section being indicated by the line 4—4 of FIG. 2.

In terms of broad inclusion, the tool of the present invention comprises a spring actuated flexible measuring tape and a ratchet actuated marking cord housed in separate compartments in a single casing, and arranged to be extended and retracted in spaced parallel relation through spaced openings formed in the casing.

In terms of greater detail, and in particular reference to the illustrative structure shown in the drawings, the invention comprises a casing of oblong shape, designated in general by the numeral 6. The casing comprises a body section 7 and a cover section 8 which telescopes over a flange 9 upon the open face of the body section. The sections may be held in assembled relation by a set screw 11, or by other suitable securing means. A partition 12 divides the casing transversely into two non-communicating compartments 13 and 14.

A spring retractable flexible measuring tape 16 is mounted within the compartment 13. The tape 16 may be of the conventional flexible pocket tape construction wherein the tape is housed in a circular case, and provided with a spring which is tensioned by withdrawal of the tape to automatically retract the tape into the casing. Since such spring retraction is well known, a detailed disclosure of that mechanism is herein unnecessary. In the present device, such a tape may be mounted upon a reel 15 within the compartment 13. The tape is arranged to be extended and retracted through an opening 17 in the end of the casing 6.

A reel 18 is mounted within the compartment 14 by means of a shaft 19 extending transversely across the compartment and journaled in conventional manner upon the front and back walls formed by the body and cover sections 7 and 8 of the casing. A cord 20 is wound onto the reel 18 and is extended through a tube 21 which extends from the partition 12 through the compartment 13 at one side of the tape 16. The tube opens into the compartment 14 at its inner end, and opens outwardly through an opening 22 in the casing spaced from the tape opening 17.

A ratchet 23 is secured to the shaft 19 between the reel 18 and the adjacent wall of the casing 6. A crank arm 24 is secured to an end of the shaft which extends through the casing wall. Preferably the crank arm 24 is hinged to a bracket 26, which in turn is secured to the adjacent end of the shaft for manually rotating the shaft and ratchet. A crank handle 27 is provided upon the free end of the arm 24. A detent opening 28 is formed in the casing 6 to engage the crank handle 27 when it is folded to an inoperative position as indicated in broken lines in FIG. 1 of the drawing. When the arm 24 is swung outwardly to operative position, as shown in full lines in FIG. 1, the handle 27 extends outwardly to provide a finger grip for turning the crank to rotate the shaft 19. Preferably the opening 28 is the end of a tube 29 secured within the casing and opening outwardly in a position to be engaged by the handle.

A pawl 30 is pivotally mounted upon the reel 18 in position to engage the teeth 31 of the ratchet 23. The pawl is urged into engagement with the ratchet by a leaf spring 32 anchored to the reel 18 by a suitable mounting pin 33. The pawl 30 rides freely over the teeth 31 of the ratchet 23 as the marking cord is drawn from the reel. When the shaft 19 and ratchet 23 are rotated in a winding direction, the pawl 30 engages the ratchet and causes the reel to rotate with the shaft for rewinding the cord onto the reel.

The compartment 14 is provided with a filling opening 34 through which powdered chalk or other suitable marking material may be introduced into the compartment. The opening 34 is normally closed by a plug 35 or other suitable closure to prevent leakage of the marking material from the compartment. The transverse partition 12 is seated tightly against the back wall of the body section 7, thereby sealing the compartment 14 from the compartment 13 along the back wall. Since the cover section 8 may permit a slight sifting of the marking material past the outer edge of the partition 12, a plate 36 is tightly fitted into the compartment 13 to exclude the marking material from the portion of the compartment which contains the tape 16.

The casing 6 is of a size and shape which can easily be carried in a user's pocket for convenient access when needed. The tape 16 may be withdrawn in conventional manner for measuring purposes independently of the marking cord. Similarly, the cord 20 may be withdrawn for use independently of the tape for marking purposes. As the cord is withdrawn from the compartment 14, a sufficient amount of marking material adheres to the cord to permit its use for making a chalk line in the ordinary manner. The tool of the present invention permits both the measuring tape and the marking cord to be conveniently carried in a single case. Also, the tool permits the tape and the cord to be withdrawn in parallel relation for use simultaneously for both measuring and marking.

Having thus described my invention, I claim:

1. A measuring and lining tool comprising a casing partitioned to form two non-communicating compartments at opposite ends thereof, a flexible spring retractable measuring tape mounted within the compartment at one end of the casing and arranged to be extended and retracted through an opening in an end of the casing, a shaft journalled upon the casing and extending transversely thereacross in the compartment at the other end of the casing, a reel rotatably mounted upon the shaft within the casing, a marking cord wound onto the reel and arranged to be extended and retracted through an opening in the casing, means for introducing a marking material into the cord reel compartment, a tube extending from said cord reel compartment through the measuring tape compartment and providing a passage therethrough whereby the measuring tape and the marking cord may be extended in parallel relation through spaced openings in the same end of the casing, a crank secured to the shaft upon the outside of the casing, a ratchet secured to the shaft inside the casing, and a spring actuated pawl mounted upon the reel and engageable with the ratchet, said pawl and ratchet being arranged to permit the cord to be paid out from the reel independently of the crank and to be rewound onto the reel by operation of the crank.

2. A measuring and lining tool comprising a casing partitioned to form two non-communicating compartments for separately containing a measuring tape and a marking cord reel, a flexible spring retractable measuring tape mounted within the tape compartment and arranged to extend through an opening in the adjacent end of the casing, a reel and marking cord mounted in the other compartment, means for introducing a marking material into the cord reel compartment, a tube extending from one compartment through the other compartment and providing a passage through said other compartment whereby the tape and the cord may be extended in parallel relation through spaced openings in the same end of the casing, and pawl and ratchet means mounted in connection with the reel operable for winding the cord onto the reel.

References Cited by the Examiner
UNITED STATES PATENTS

| 987,628 | 3/11 | Vom Hofe | 242—84.54 |
| 997,803 | 7/11 | Griffin | 33—87 |
| 1,945,842 | 2/34 | Witchger | 33—138 |
| 2,589,500 | 3/52 | Landon | 33—217 |
| 3,046,663 | 7/62 | Romero | 33—87 |

FOREIGN PATENTS

| 265,414 | 2/27 | Great Britain. |
| 235,630 | 4/45 | Switzerland. |

ISAAC LISANN, *Primary Examiner*.